United States Patent [19]
Kawasaki et al.

[11] Patent Number: 5,737,248
[45] Date of Patent: Apr. 7, 1998

[54] DEVICE FOR ALTERING THE OUTPUT CONDITIONS OF AN INFORMATION PROCESSING DEVICE ACCORDING TO INPUT STATES AT THE USER'S KEYBOARD

[75] Inventors: Yuji Kawasaki, Kanagawa; Shunpei Yamazaki, Tokyo, both of Japan

[73] Assignee: Semiconductor Energy Laboratory Co., Ltd., Kanagawa, Japan

[21] Appl. No.: 538,010

[22] Filed: Oct. 2, 1995

[30] Foreign Application Priority Data

Oct. 5, 1994 [JP] Japan .................. 6-266192

[51] Int. Cl.[6] .................. G06F 3/14; H04N 1/393; H04N 1/60
[52] U.S. Cl. .................. 364/569; 364/481; 364/551.01; 364/569; 358/452; 358/455; 358/518; 358/537
[58] Field of Search .................. 364/487, 521, 364/518, 200, 707, 481, 551.01; 341/27; 358/448, 451, 458, 452, 455, 518, 537; 348/30; 327/176; 395/835

[56] References Cited

U.S. PATENT DOCUMENTS

| | | | |
|---|---|---|---|
| 3,755,691 | 8/1973 | Cassarino | 327/176 |
| 4,695,828 | 9/1987 | Yamamoto | 341/27 |
| 4,841,454 | 6/1989 | Awazu | 345/123 |
| 4,860,091 | 8/1989 | Kimura et al. | 358/22 |
| 5,282,213 | 1/1994 | Leigh et al. | 364/487 |
| 5,384,721 | 1/1995 | Joto | 364/707 |
| 5,436,734 | 7/1995 | Yamauchi et al. | 358/448 |
| 5,438,675 | 8/1995 | Fujioka | 364/265.5 |
| 5,469,275 | 11/1995 | Edgar | 358/458 |

FOREIGN PATENT DOCUMENTS

| | | | |
|---|---|---|---|
| 00361869A2 | 4/1990 | European Pat. Off. | G06F 1/32 |
| 00397471A2 | 11/1990 | European Pat. Off. | G06F 11/00 |
| 00430165A2 | 6/1991 | European Pat. Off. | H04N 1/40 |
| 55-82335 | 6/1980 | Japan | G06F 3/02 |
| 58-195915 | 11/1983 | Japan | G06F 3/00 |
| 59-221723 | 12/1984 | Japan | G06F 3/00 |
| 63-75871 | 4/1988 | Japan | G06F 15/20 |
| 2-280459 | 11/1990 | Japan | H04N 1/387 |
| 2-294753 | 12/1990 | Japan | G06F 13/00 |
| 3-280115 | 12/1991 | Japan | G06F 1/26 |
| WO 09116785A1 | 10/1991 | WIPO | H04N 1/46 |

OTHER PUBLICATIONS

The user's guide for MS Draw, pp. 64, 66 MS Corporation Doc. #OB-22377-0991), 1991.

Primary Examiner—James P. Trammell
Assistant Examiner—Cuong H. Nguyen
Attorney, Agent, or Firm—Sixbey, Friedman, Leedom & Ferguson, P.C.; Gerald J. Ferguson, Jr.

[57] ABSTRACT

The object of the invention is to change the output conditions of a data processing device in accordance with a user's working state, and thereby reduce user fatigue and stress.

A keyboard is provided as an input device, the time intervals of depression of random pairs of key switches of the keyboard by a user are determined for all the key switch combinations of the keyboard, the scatter of the time intervals of depression of the pairs of key switches is regarded as an arbitrary distribution, a range determined by variance, in an arbitrary proportion, relative to the average value of the time interval distribution is determined, and if the time intervals of depression of arbitrary pairs of key switches by the user is outside this range, the data processing device's output conditions are altered.

29 Claims, 3 Drawing Sheets

5,737,248

DEVICE FOR ALTERING THE OUTPUT CONDITIONS OF AN INFORMATION PROCESSING DEVICE ACCORDING TO INPUT STATES AT THE USER'S KEYBOARD

BACKGROUND OF THE INVENTION

1. Field of the Invention

The present invention relates to an information processing device. More particularly, the invention relates to a method of altering the output conditions of the output unit of a data processing device in correspondence to changes in the input states at a user's keyboard.

2. Description of the Related Art

Conventionally in a data processing device which is provided with a keyboard as an input device and has an output unit by which input data from the keyboard are output as characters, on input of character data from the keyboard, interrupt signals are activated by the keyboard, a CPU (Central Processing Unit) performs interrupt processing, character codes that have been input from the keyboard are transferred to a display unit controller, and the display unit controller outputs characters to a display unit.

The above series of operations are synchronized by an operations clock inside the data processing device, and, since the time required from when characters are input to when they are output is more or less constant, there is failure to achieve optimum output speeds during work by a user.

Also, the size of characters that are output is always constant, and the quantity of displayed characters that are required during work by a user is not optimized.

Further, with regard to the display unit's lighting intensity too, although there are products possessing a function for stopping displays by the display unit if no characters are input from the keyboard for a long time, there are no products in which the display unit's lighting intensity is adjusted in accordance with the keyboard input speed. When characters are input continuously from a keyboard, the lengths of time the user looks at the display unit vary depending on circumstances, but the display unit's displayed character size, display speed, lighting intensity and contrast are constant, and, therefore, if the display unit is looked at for a long time, the user easily becomes tired.

SUMMARY OF THE INVENTION

Conventionally in an, information processing device which is provided with a keyboard as an input device and has an output unit by which data input from the keyboard are output and displayed, when a user inputs data from the keyboard, the form of output of character data by a display unit is that the size of displayed character data, the display speed and the display unit's lighting intensity are all constant, regardless of the user's physical state or working efficiency.

For example, if a user inputs characters while in the process of composing a text, there is a tendency for the periods of time for which the user looks hard at the screen to be long, but even in the case of work such as this during which the display unit is looked at for long periods of time, the display unit's displayed character data size, display speed, lighting intensity and contrast, etc. still remain constant.

This disregards the state of the user, and it constitutes one cause of user fatigue and technostress.

There is therefore a demand for there to be devised a system which produces data processing device output in correspondence to the working states of users, in order to reduce user fatigue and stress.

One invention disclosed in this specification for the purpose of resolving the above problem is
a data processing device in which,
    in a data processing device which is provided with a keyboard as an input device which is provided with an output unit by which input data from the keyboard are output,
    the time intervals between depression of random pairs of key switches of the keyboard by a user are determined for all the key switch combinations of the keyboard,
    the scatter of the time intervals between depression of the pairs of key switches is regarded as an arbitrary distribution, and a variance range, determined in an arbitrary proportion, relative to the average value of the distribution of the time intervals is determined,
    and, when the time intervals between depression of random pairs of keyboard key switches by the user are outside the above range, the form of output by the output unit is changed.

Another invention disclosed in this specification is
a data processing device in which,
    in a data processing device which is provided with a keyboard and an input device and is provided with an output unit by which input data from the keyboard are output,
    the time intervals between depression of random pairs of key switches of the keyboard by a user are determined for all the key switch combinations of the keyboard,
    the scatter of the time intervals between depression of the pairs of key switches is regarded as an arbitrary distribution, and a variance range, determined in an arbitrary proportion, relative to the average value of the distribution of the time intervals is determined,
    and, when the time intervals between depression of random pairs of keyboard key switches by the user are shorter than the time intervals of the above-noted range, the size of characters which are output to the output unit is increased.

Another invention disclosed in this specification is
a data processing device in which,
    in a data processing device which is provided with a keyboard and an input device and is provided with an output unit by which input data from the keyboard are output,
    the time intervals between depression of random pairs of key switches of the keyboard by a user are determined for all the key switch combinations of the keyboard,
    the scatter of the time intervals between depression of the pairs of key switches is regarded as an arbitrary distribution, and a variance range, determined in an arbitrary proportion, relative to the average value of the distribution of the time intervals is determined,
    and, when the time intervals between depression of random pairs of keyboard key switches by the user are longer than the time intervals of the above-noted range, the size of characters which are output to the output unit is reduced and the number of displayed characters is increased.

Another invention disclosed this specification is
a data processing device in which,
    in a data processing device which is provided with a keyboard and an input device and is provided with an output unit by which input data from the keyboard are output, the time intervals between depression of random pairs of key switches of the keyboard by a user are determined for all the key switch combinations of the keyboard, the scatter of the time intervals between depression of the pairs of key switches is regarded as an arbitrary distribution, and a variance range, determined in an arbitrary proportion, relative to the average value of the distribution of the time intervals is determined, and, when the time intervals between depression of random pairs of keyboard key switches by the user are shorter than the time intervals of the above-noted range, the speed of output of character data to the output unit is made faster.

Another invention disclosed this specification is a data processing device in which, in a data processing device which is provided with a keyboard and an input device and is provided with an output unit by which input data from the keyboard are output, the time intervals between depression of random pairs of key switches of the keyboard by a user are determined for all the key switch combinations of the keyboard, the scatter of the time intervals between depression of the pairs of key switches is regarded as an arbitrary distribution, and a variance range, determined in an arbitrary proportion, relative to the average value of the distribution of the time intervals is determined, and, when the time intervals between depression of random pairs of keyboard key switches by the user are longer than the time intervals of the above-noted range, the speed of output of character data to the output unit is made slower.

Another invention disclosed this specification is a data processing device in which, in a data processing device which is provided with a keyboard and an input device and is provided with an output unit by which input data from the keyboard are output, the time intervals between depression of random pairs of key switches of the keyboard by a user are determined for all the key switch combinations of the keyboard, the scatter of the time intervals between depression of the pairs of key switches is regarded as an arbitrary distribution, and a variance range, determined in an arbitrary proportion, relative to the average value of the distribution of the time intervals is determined, and, when the time intervals between depression of random pairs of keyboard key switches by the user are shorter than the time intervals of the above-noted range, the lighting intensity of the output unit is made brighter.

Another invention disclosed this specification is a data processing device in which, in a data processing device which is provided with a keyboard and an input device and is provided with an output unit by which input data from the keyboard are output, the time intervals between depression of random pairs of key switches of the keyboard by a user are determined for all the key switch combinations of the keyboard, the scatter of the time intervals between depression of the pairs of key switches is regarded as an arbitrary distribution, and a variance range, determined in an arbitrary proportion, relative to the average value of the distribution of the time intervals is determined, and, when the time intervals between depression of random pairs of keyboard key switches by the user are shorter than the time intervals of the abovenoted range, the lighting intensity of the output unit is made darker.

Another invention disclosed this specification is a data processing device in which, in a data processing device which is provided with a keyboard and an input device and is provided with an output unit by which input data from the keyboard are output, the time intervals between depression of random pairs of key switches of the keyboard by a user are determined for all the key switch combinations of the keyboard, the scatter of the time intervals between depression of the pairs of key switches is regarded as an arbitrary distribution, and a variance range, determined in an arbitrary proportion, relative to the average value of the distribution of the time intervals is determined, and, when the time intervals between depression of random pairs of keyboard key switches by the user are longer than the time intervals of the above-noted range, the lighting intensity of the output unit is made brighter.

Another invention disclosed this specification is a data processing device in which, in a data processing device which is provided with a keyboard and an input device and is provided with an output unit by which input data from the keyboard are output, the time intervals between depression of random pairs of key switches of the keyboard by a user are determined for all the key switch combinations of the keyboard, the scatter of the time intervals between depression of the pairs of key switches is regarded as an arbitrary distribution, and a variance range, determined in an arbitrary proportion, relative to the average value of the distribution of the time intervals is determined and, when the time intervals between depression of random pairs of keyboard key switches by the user are longer than the time intervals of the above-noted range, the lighting intensity of the output unit is made darker.

By measuring the time intervals of normal keyboard input by a user, the invention with the above structure makes a relative judgement of the state of current keyboard input by the user and changes the display mode and display state in the display unit of a data processing device.

DETAILED DESCRIPTION OF THE PREFERRED EMBODIMENTS

Embodiment 1

Figure 1:
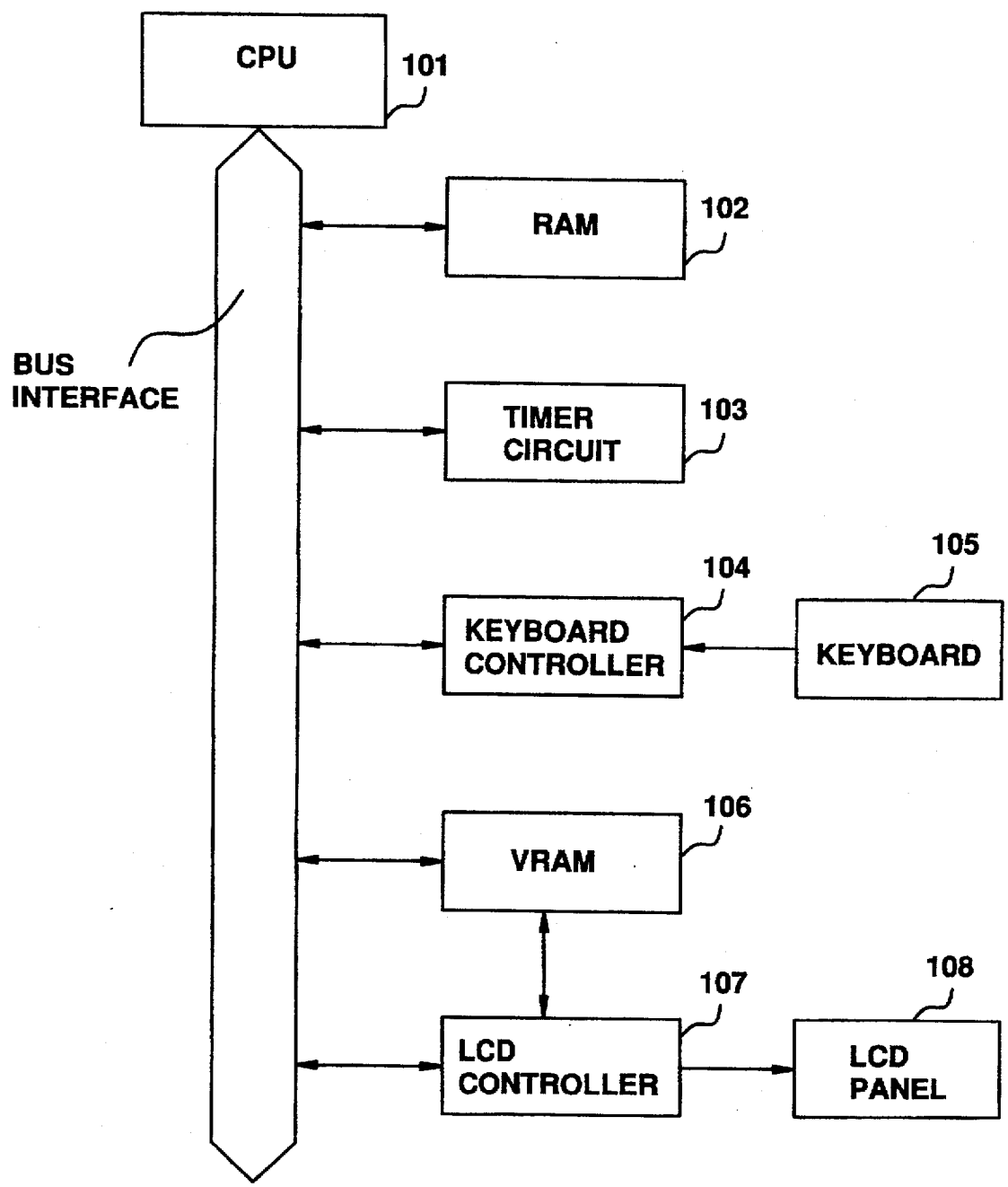
FIG. 1 is a block diagram of a data processing device in a 1st embodiment.

FIG. 1 is a block diagram of the data processing device in the 1st embodiment, and it shows a data processing device in which the size of characters that are output (displayed) by a display unit is changed in accordance with the input speed. Only the parts necessary for changing the size of characters will be described with reference to this drawing.

A CPU 101 is the central operational processing unit of the data processing device, and it controls a keyboard 105, a keyboard controller 104, a timer circuit 103, a VRAM (Video Random Access Memory) 106 and an LCD (Liquid Crystal Display) controller 107.

The keyboard 105 serves for input of data to the data processing device, and data that have been input go via the keyboard controller 104, are transferred by the CPU 101 to the LCD controller 107, and are displayed on an LCD Panel 108.

The keyboard controller 104 controls the keyboard 105, and it effects data input control and transmission of interrupt signals.

The timer circuit 103 comprises a timer which starts counts in response to interrupt signals from the keyboard controller 104. An interrupt signal from the keyboard controller 104 causes the timer circuit 103 to start a timer count, and the next interrupt signal from the keyboard 105 causes the timer, which is currently in operation, to stop. In this manner, the time interval between keyboard interrupts can be determined by means of the timer circuit 103.

The LCD controller 107 controls the LCD panel 108, and it receives data output by the CPU 101 and outputs them to the LCD panel 108.

Further, depending on the time intervals between keyboard interrupts, the CPU 101 can restrict the number of characters that are output by the display unit and optimize the number of characters that are displayed by the display unit.

The operation in this embodiment will now be described.

On arrival of data input from the keyboard 105, the keyboard controller 104 outputs an interrupt signal to the timer circuit 103. In the timer circuit 103, the internal timer is started, and a count is continued until the next time an interrupt signal is input. On input of this interrupt signal, the currently operating timer in the timer circuit 103 is stopped.

The CPU 101 calculates the input interval on the basis of the count value of the internal timer of the timer circuit 103 that has been stopped and stores it in a RAM 102. The above is repeated, and the input time intervals $\Delta t$ for random pairs of key switches are stored in the RAM 102. Then, the average value $\mu$ and the variance $\sigma$ of the input time intervals $\Delta t$ between the random pairs of key switches of the keyboard 105 are determined by the CPU 101, and these input time intervals are regarded as a normal distribution. Depending on circumstances, a gamma distribution may be used.

Then, $(\mu-1.96\sigma) \leq t \geq (\mu+1.96\sigma)$ is taken as the average input time interval $\Delta t$ range relative to the average value $\mu$, and a conversion table for the input time interval $\Delta t$ range for all the combinations of pairs of key switches of the keyboard is prepared.

After that, on input of any pairs of key switches from the keyboard 105, the CPU 101 determines the time intervals $\Delta t$, and determines, from the above-noted conversion table, how far the time intervals $\Delta t$ depart from the average value. Then, the number of character data that are displayed by the LCD panel 108 is set by the CPU 101 in accordance with the proportion of departure from the average value, and, together with this, the CPU 101 also sets the size of the character data, and sends character data to the LCD controller 107 and causes them to be output to the LCD panel 108. Character data corresponding to a standard LCD panel 108 display screen are stored in the Video-Random-Access-Memory 106.

In the above manner, the size and the number of characters displayed by the LCD panel 108 can be changed in accordance with the keyboard 105 input time intervals $\Delta t$.

Thus, if the time intervals $\Delta t$ of input from the keyboard 105 are shorter than the average value scatter range, the user's working efficiency can be regarded as being extremely good, and since the user does not need a large number of displayed characters when he or she inputs character data, in this case the size of the characters output to the LCD panel 108 is made larger, and the number of characters is reduced.

On the other hand, if the time intervals $\Delta t$ of input from the keyboard 105 are longer than the average value scatter range, the working efficiency of the user can be regarded as being poor, and it can be inferred that the user is thinking about things while inputting character data. During the input of character data, therefore, the user needs to see more of the character data that have been input so far, and so in this case the size of the characters output to the LCD panel 108 is made smaller, and the number of characters is increased.

Embodiment 2

Figure 2:
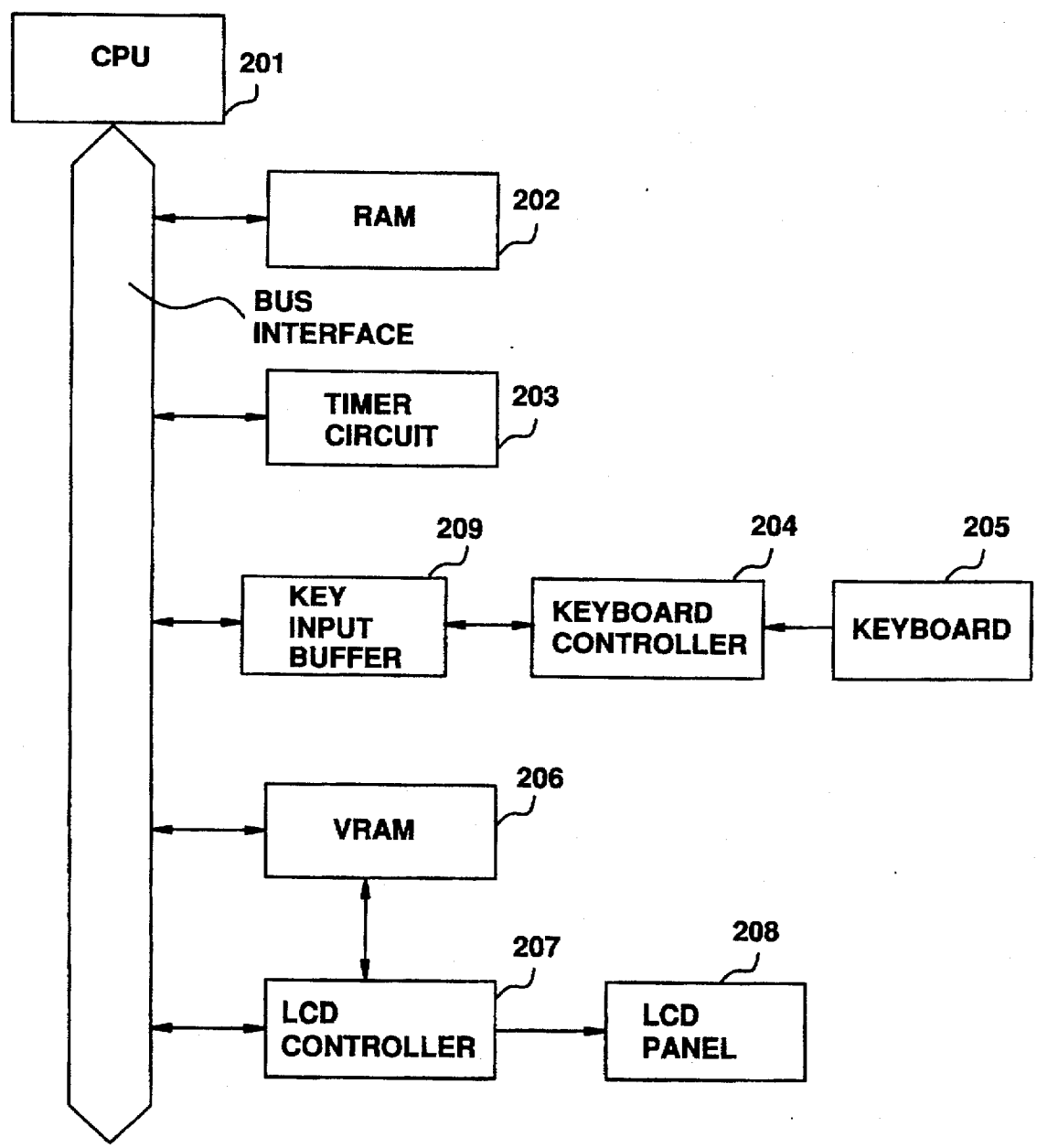
FIG. 2 is a block diagram of a data processing device in a 2nd embodiment.

FIG. 2 is a block diagram of the data processing device in the 2nd embodiment, and it shows a data-processing device in which the output speed of character data that are output by a display unit is changed in accordance with the input speed. Only parts necessary for changing the character data output speed will be described with reference to this drawing.

A CPU 201 is the central operational processing unit of the data processing device, and it controls inputs from a keyboard 205, a keyboard controller 204, a timer circuit 203, a VRAM 206, an LCD controller 207 and a key input buffer 209.

The keyboard 205 serves for input of data to the data processing device, and data that have been input go via the keyboard controller 204 and key input buffer 209, are transferred by the CPU 201 to the LCD controller 207, and are displayed on an LCD panel 208.

The keyboard controller 204 controls the inputs from the keyboard 205, and it effects, data input control and transmission of interrupt signals.

The key input buffer 209 produces a delay in correspondence to user input time intervals when the CPU 201 reads character data from the keyboard controller 204.

The timer circuit 203 comprises a timer which starts counts in response to interrupt signals from the keyboard controller 204. When an interrupt signal is input from the keyboard controller 204, the timer circuit 203 starts a count by the internal timer, and the next interrupt signal from the keyboard 205 causes the currently operating timer to stop. In this manner, the time interval between keyboard interrupts can be determined by means of the timer circuit 203.

The LCD controller 207 controls the LCD panel 208, and it receives data output by the CPU 201 and outputs them to the LCD panel 208.

The CPU 201 controls the times at which character data are output to the display unit in accordance with the input time intervals of interrupt signals from the keyboard 205, and it can optimize the display speed of characters that are displayed by the display unit.

The operation in this embodiment will now be described.

On arrival of data input from the keyboard 205, the keyboard controller 204 outputs an interrupt signal to the timer circuit 203. In the timer circuit 203, the internal timer is actuated, and counting commences. On input of the next interrupt signal, the timer circuit 203 stops the currently operating timer.

The CPU 201 calculates the input interval on the basis of the count value of the timer of the timer circuit 203 that has been stopped and stores it in a RAM 202. The above is repeated, and the input time intervals Δt for random pairs of key switches are stored in the RAM 202. Then, the average value μ and the variance σ of the input time intervals Δt between the random pairs of key switches of the keyboard 205 are determined by the CPU 201, and these input time intervals are regarded as a normal distribution. Depending on circumstances, a gamma distribution may be used.

Then, $(\mu-1.96\sigma) \leq t \geq (\mu=1.96\sigma)$ is taken as the average input time interval Δt range relative to the average value μ, and a conversion table for the input time interval Δt range for all the combinations of pairs of key switches of the keyboard 205 is prepared.

After that, on input of any pairs of key switches from the keyboard 205, the CPU 201 determines the time intervals Δt, and determines, from the above-noted conversion table, how far the time intervals Δt depart from the average value. Then, a delay time for the data output of the key input buffer 209 is set by the CPU 201 in accordance with the proportion of departure from the average value.

In the above manner, the speed of output of character data to the LCD panel 208 can be changed in accordance with the keyboard 205 input time intervals Δt.

Thus, if the time intervals Δt of input from the keyboard 205 are shorter than the average value scatter range, the user's working efficiency can be regarded as being extremely good, and since, after inputting character data, the user wants character data to be output faster than the standard display speed, in this case the speed of output to the LCD panel 208 is increased.

On the other hand, if the time intervals Δt of input from the keyboard 205 are longer than the average value scatter range, the working efficiency of the user can be regarded as being poor, and it can be inferred that the user is thinking about things while inputting character data. In this case, therefore, since output of character data faster than the standard display speed is not needed after the user has input character data, the speed of output to the LCD panel 208 is made slow.

Embodiment 3

Figure 3:
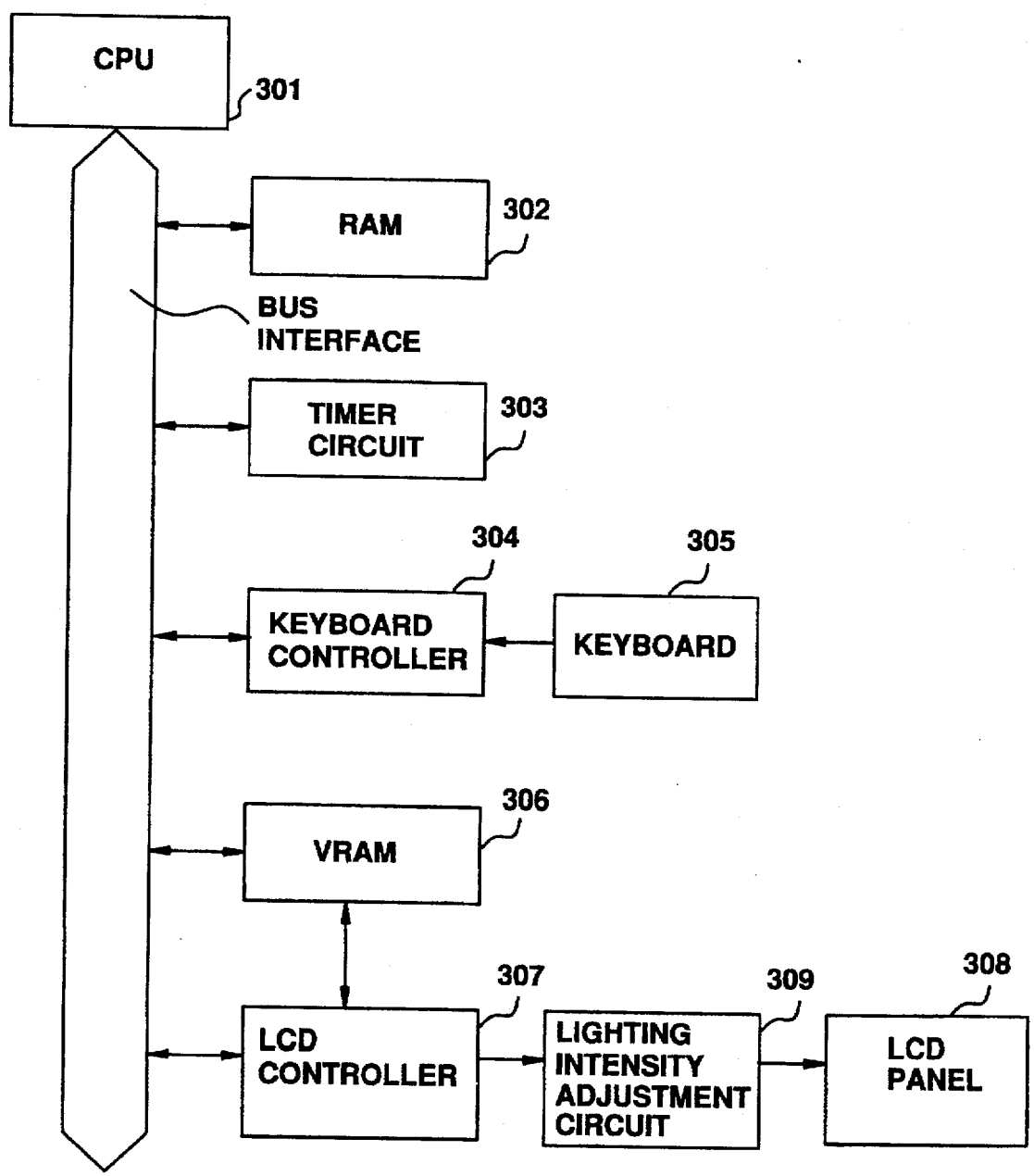
FIG. 3 is a block diagram of a data processing device in a 3rd embodiment.

FIG. 3 is a block diagram of the data processing device in the 3rd embodiment, and it shows a data processing device in which the display unit's lighting intensity (the LCD's backlight brightness in this case) is changed in accordance with the input speed. Only the parts necessary for changing the character data size will be described with reference to this drawing.

A CPU 301 is the central operational processing unit of the data processing device, and it controls the inputs from a keyboard 305, a keyboard controller 304, a timer circuit 303, a VRAM 306, an LCD controller 307 and a lighting intensity adjustment circuit 309.

The keyboard 305 serves for input of data to the data processing device, and data that have been input go via the keyboard controller 304, are transferred by the CPU 301 to the LCD controller 307, and are displayed on an LCD panel 308.

The keyboard controller 304 controls the keyboard 305, and it effects data input control and transmission of interrupt signals.

The timer circuit 303 comprises a timer which starts counts in response to interrupt signals from the keyboard controller 304. When an interrupt signal is input from the keyboard controller 304, the timer circuit 303 starts a count by an internal timer, and the next interrupt signal from the keyboard 305 causes the currently operating timer to stop. In this manner, the time interval between keyboard interrupts can be determined by means of the timer circuit 303.

The LCD controller 307 controls the lighting intensity adjustment circuit 309 and LCD panel 308, and it receives data and lighting intensity data output by the CPU 301 and outputs them to the LCD panel 308.

The CPU 301 controls the lighting intensity of the LCD panel 308 in accordance with the input time intervals of interrupt signals from the keyboard 305.

The operation in this embodiment will now be described.

On arrival of data input from the keyboard 305, the keyboard controller 304 outputs an interrupt signal to the timer circuit 303, the timer circuit 303 starts the timer, and a count is started. On input of the next interrupt signal, the timer circuit 303 stops the currently operating timer.

The CPU 301 calculates the input interval on the basis of the count value of the timer of the timer circuit 303 that has been stopped and stores it in a RAM 302. The above is repeated, and the input time intervals Δt for random pairs of key switches are stored in the RAM 302. Then, the average value μ and the variance σ of the input time intervals Δt between the random pairs of key switches of the keyboard 305 are determined by the CPU 301, and these input time intervals are regarded as a normal distribution. Depending on circumstances, a gamma distribution may be used.

Then, $(\mu-1.96\sigma) \leq t \geq (\mu+1.96\sigma)$ is taken as the average input time interval Δt range relative to the average value μ, and a conversion table for the input time interval Δt range for all the combinations of pairs of key switches of the keyboard is prepared.

After that, on input of any pairs of key switches from the keyboard 305, the CPU 301 determines the time intervals Δt, and determines, from the above-noted conversion table, how far the time intervals Δt depart from the average value. Then, the CPU 301 sets the lighting intensity of the LCD panel 308 in accordance with the proportion of departure from the average value.

In the above manner, the lighting intensity of the LCD panel 308 can be changed in accordance with the keyboard 305 input time intervals Δt.

Thus, if the time intervals Δt of input from the keyboard 305 are shorter than the average value scatter range, the user can be considered to be concentrating on the work in hand, and it can be surmised that he or she is looking hard at the display unit, and so in this case, the lighting intensity of the LCD panel 308 is made weaker (darker), in order to reduce fatigue of the user's eyes.

If the time intervals Δt of input from the keyboard 305 are longer than the average value scatter range, the working efficiency of the user can be regarded as being poor, and it can be inferred that the user is thinking about things while inputting character data. In this case, therefore, the lighting intensity of the LCD panel 308 is made stronger (brighter), in order to make the characters on the screen easier to identify.

Alternatively, in this embodiment, adjustments may be such that the strengthening and weakening of the lighting intensity of the LCD panel 308 are the reverse of the above.

For example, in some cases, if the time intervals Δt of input from the keyboard 305 are shorter than the average value scatter range, it is because the user is inputting successive data while looking at a document that is to hand. In such a case, the lighting intensity of the LCD panel 308 is made stronger, in order to permit easier identification of the characters on the screen, which the user looks at from time to time.

On the other hand, there are cases in which, if the time intervals of input from the keyboard 305 are longer than the average value scatter range, the user can be considered to be engaged in editing or composition, etc. of a document while looking hard at the screen. In this case, the lighting intensity of the LCD panel 308 is reduced, in order to lessen fatigue of the user's eyes.

The structure may be made such that the selection of these combinations of input states and lighting intensity is discretionary or is automatic.

Thus, by measuring the time intervals of normal keyboard input by a user, the invention makes it possible for a relative judgement of the state of the current keyboard input by the user to be made, and it makes it possible to change the mode and state of the display given by the display unit if a data processing device, and thereby makes it possible to reduce user fatigue and stress.

What is claimed is:

1. An information processing device comprising:
a keyboard as an input device; and
an output device for outputting an input data from said keyboard,
wherein time interval during which a user presses arbitrary two key switches on said keyboard is measured with respect to all combinations of key switches of said keyboard,
wherein variance range of distribution about scatter of the measured time interval is determined in an arbitrary rate, relative to an average value of the distribution of said time interval, and
wherein outputting state of said output device is changed when time interval during which a user presses arbitrary two key switches on said keyboard is outside said variance range.

2. The device of claim, 1 wherein a normal distribution is applied as the distribution of the measured interval.

3. The device of claim 1 wherein a gamma distribution is applied as the distribution of the measured interval.

4. The device of claim 1 wherein the change of said outputting state of said output device includes the enlargement of the size of a character to be outputted in said output device.

5. The device of claim 1 wherein the change of said outputting state of said output device includes increasing the rate of outputting character data to said output device.

6. The device of claim 1 wherein the change of said outputting state of said output device includes decreasing the rate of outputting character data to said output device.

7. The device of claim 1 wherein the change of said outputting state of said output device includes making a lighting intensity of said output device brighter.

8. The device of claim 1 wherein the change of said outputting state of said output device includes making a lighting intensity of said output device darker.

9. The device of claim 1 wherein the change of said outputting state of said output device includes making bold a character to be outputted.

10. The device of claim 1 wherein the change of said outputting state of said output device includes making dense a character to be outputted.

11. The device of claim 1 wherein the change of said outputting state of said output device includes making sparse a character to be outputted.

12. An information processing device comprising:
a keyboard as an input device; and
an output device for outputting an input data from said keyboard,
wherein time interval during which a user presses arbitrary two key switches on said keyboard is measured with respect to all combinations of key switches of said keyboard,
wherein variance range of distribution about scatter of the measured time interval is determined in an arbitrary rate, relative to an average value of the distribution of said time interval, and
wherein size of character to be outputted in said output device is enlarged when time interval during which a user presses arbitrary two key switches on said keyboard is shorter than that within said variance range.

13. The device of claim 12 wherein a normal distribution is applied as the distribution of the measured interval.

14. The device of claim 12 wherein a gamma distribution is applied as the distribution of the measured interval.

15. An information processing device comprising:
a keyboard as an input device; and
an output device for outputting an input data from said keyboard,
wherein time interval during which a user presses arbitrary two key switches on said keyboard is measured with respect to all combinations of key switches of said keyboard,
wherein variance range of distribution about scatter of the measured time interval is determined in an arbitrary rate, relative to an average value of the distribution of said time interval, and
wherein rate of outputting a character data to said output device is increased when time interval during which a user presses arbitrary two key switches on said keyboard is shorter than that within said variance range.

16. The device of claim 15 wherein a normal distribution is applied as the distribution of the measured interval.

17. The device of claim 15 wherein a gamma distribution is applied as the distribution of the measured interval.

18. An information processing device comprising:
a keyboard as an input device; and
an output device for outputting an input data from said keyboard,
wherein time interval during which a user presses arbitrary two key switches on said keyboard is measured with respect to all combinations of key switches of said keyboard,
wherein variance range of distribution about scatter of the measured time interval is determined in an arbitrary rate, relative to an average value of the distribution of said time interval, and
wherein rate of outputting a character data to said output device is decreased when time interval during which a user presses arbitrary two key switches on said keyboard is longer than that within said variance range.

19. The device of claim 18 wherein a normal distribution is applied as the distribution of the measured interval.

20. The device of claim 18 wherein a gamma distribution is applied as the distribution of the measured interval.

21. An information processing device comprising:

a keyboard as an input device; and an output device for outputting an input data from said keyboard, wherein time interval during which a user presses arbitrary two key switches on said keyboard is measured with respect to all combinations of key switches of said keyboard, wherein variance range of distribution about scatter of the measured time interval is determined in an arbitrary rate, relative to an average value of the distribution of said time interval, and wherein lighting intensity of said output device is made brighter when time interval during which a user presses arbitrary two key switches on said keyboard is shorter than that within said variance range.

22. The device of claim 21 wherein a normal distribution is applied as the distribution of the measured interval.

23. The device of claim 21 wherein a gamma distribution is applied as the distribution of the measured interval.

24. An information processing device comprising:

a keyboard as an input device; and an output device for outputting an input data from said keyboard, wherein time interval during which a user presses arbitrary two key switches on said keyboard is measured with respect to all combinations of key switches of said keyboard, wherein variance range of distribution about scatter of the measured time interval is determined in an arbitrary rate, relative to an average value of the distribution of said time interval, and wherein lighting intensity of said output device is made brighter when time interval during which a user presses arbitrary two key switches on said keyboard is longer than that within said variance range.

25. The device of claim 24 wherein a normal distribution is applied as the distribution of the measured interval.

26. The device of claim 24 wherein a gamma distribution is applied as the distribution of the measured interval.

27. An information processing device comprising:

a keyboard as an input device; and an output device for outputting an input data from said keyboard, wherein time interval during which a user presses arbitrary two key switches on said keyboard is measured with respect to all combinations of key switches of said keyboard, wherein variance range of distribution about scatter of the measured time interval is determined in an arbitrary rate, relative to an average value of the distribution of said time interval, and wherein lighting intensity of said output device is made darker when time interval during which a user presses arbitrary two key switches on said keyboard is longer than that within said variance range.

28. The device of claim 27 wherein a normal distribution is applied as the distribution of the measured interval.

29. The device of claim 27 wherein a gamma distribution is applied as the distribution of the measured interval.

* * * * *